March 28, 1950     C. P. FISCHER     2,502,318
APPARATUS FOR PROTECTING THE BEARINGS OF
AN ENGINE AGAINST LUBRICATING FAILURES
Filed Nov. 4, 1946
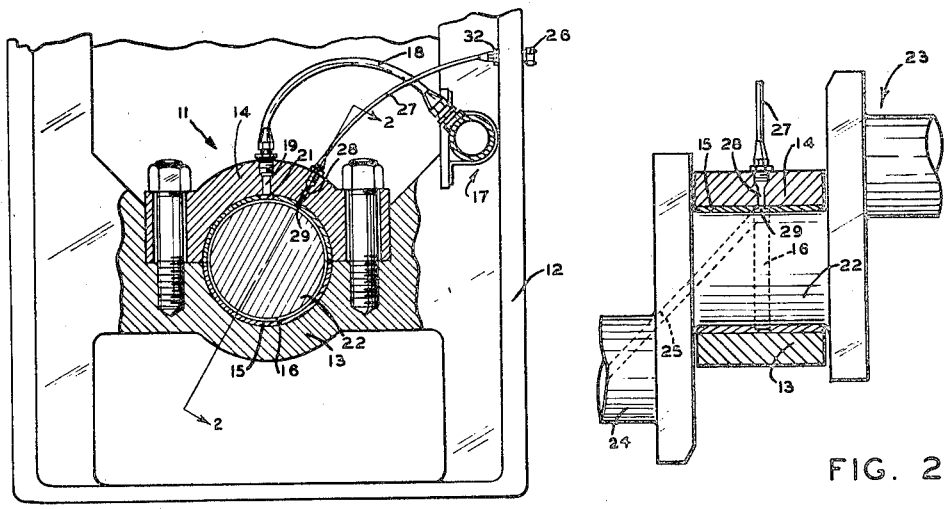
FIG. 1
FIG. 2
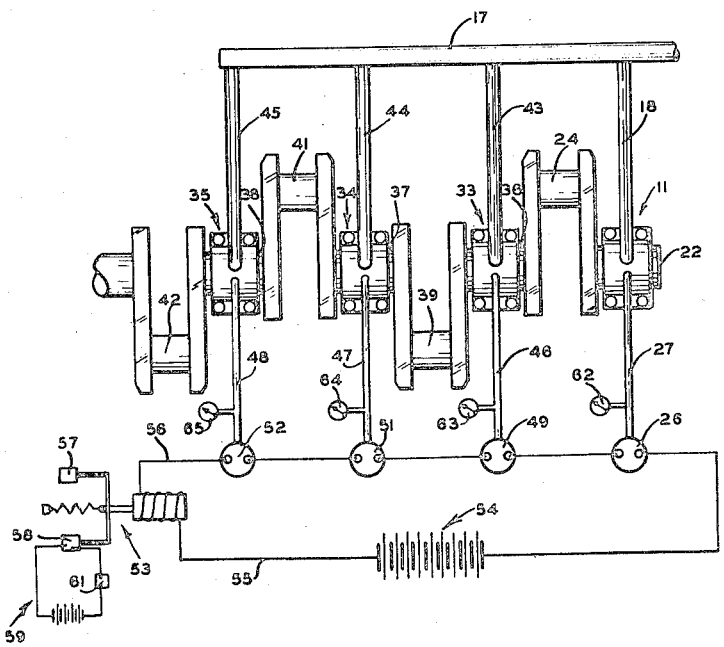
FIG. 4
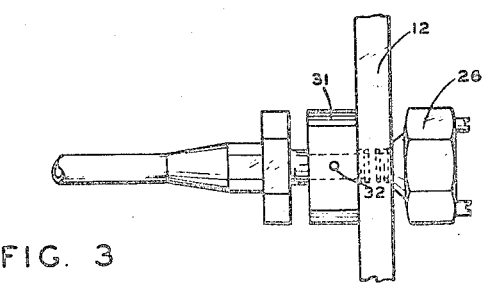
FIG. 3
INVENTOR
CLARENCE P. FISCHER
BY *John H. Cassidy*
ATTORNEY Patented Mar. 28, 1950

2,502,318

UNITED STATES PATENT OFFICE 2,502,318

APPARATUS FOR PROTECTING THE BEARINGS OF AN ENGINE AGAINST LUBRICATING FAILURES

Clarence P. Fischer, St. Louis County, Mo.

Application November 4, 1946, Serial No. 707,593

3 Claims. (Cl. 184—6)

1

This invention relates to apparatus for protecting the bearings of an engine, such as a Diesel engine, against damage thereto resulting from any failure of the engine's lubricating system to deliver oil to the friction surfaces of each of said bearings.

Although the lubricating systems of most engines have been under constant development and improvement, they are not infallible and occasionally serious engine trouble results from damaged bearings caused by insufficient lubrication. As a safeguard against such failures, lubricating oil alarm systems have been proposed which are intended to detect the failure of the lubricating system before harm is done to the bearings. It is with such alarm systems that the instant invention deals, and, while the prior art devices have met with limited commercial success they possess certain inherent disadvantages which are overcome by applicant's device.

Without exception, all of the prior art alarm systems rely upon a detection of an absence of oil pressure in the oil supply line to the bearing to activate an audible, visual, or audible and visible signal, or to shut down the engine. Since it is possible for a lubricating system to fail at points beyond the supply line, notably within the bearing itself, these alarms are ineffective to detect failures at the most critical points in the engine, to-wit, its bearings.

Accordingly, it is a general object of the instant invention to provide an engine protecting device in the form of a lubricating oil alarm system capable of detecting the absence of a lubricant at the friction surface of a bearing with absolute certainty.

It is also an object of the invention to provide an engine protective device of the type described, which is positive in operation, is of simple construction, is easily and economically installed, and is adaptable either to give a warning to an operator or to automatically shut down an engine upon the condition of an oil failure at the friction surface of any bearing in the engine.

Other objects and advantages will become apparent as the description proceeds and a more comprehensive understanding of the invention will be afforded from the following detailed specification when considered in conjunction with the accompanying drawing, in which Fig. 1 is a fragmentary view of an engine illustrating the application of a lubricating oil detecting system embodying the instant invention to one of its main bearings, which is shown in cross section,

2

Fig. 2 is a partial sectional view of the engine illustrated in Figure 1, taken along the line 2—2 thereof, Fig. 3 is an enlarged view of a pressure switch and fittings employed in the apparatus illustrated in Fig. 1, and Fig. 4 is a diagrammatic illustration of a complete alarm system embodying the instant invention.

Although the instant invention is not limited in use with any particular type of engine, it will be described in its application to Diesel engines in order to take advantage of certain illustrative problems confronted in detecting oil failures at the bearings of this particular type of prime mover.

With reference to Fig. 1 of the drawing, a main bearing of an engine, generally designated 11, is illustrated as being enclosed in a crank case 12. The bearing, in this particular illustrative example, comprises a base 13, a bearing cap 14 and a bearing shell 15. The latter element is channelled internally with a groove or recess 16 into which oil is fed for even distribution around the bearing shell.

Oil, under pressure is supplied to this groove from a main oil header 17 by means of an oil line 18, which, in this case, supplies oil to the main bearing 11. The main bearing cap 14 is drilled to form a port 19 which is aligned with a hole 21 in the shell 15 communicating with the recess 16 therein. Through these means oil is supplied directly to a main journal 22 of the engine's crank shaft 23 and indirectly to a crank pin 24 thereof through a port 25 drilled in the shaft.

The portion of the engine just described deals with a conventional lubricating system and forms no part of the invention. It will be observed, at this point, however, that the presence of oil pressure in the line 18 does not necessarily mean that oil is being supplied to the inside surfaces of the bearing shell 15. In fact, and as is occasionally true, particularly in Diesel engines, the port 19 becomes clogged or the bearing shell 15 turns within the base 13 and cap 14 to close this port and oil is cut off from the bearing.

Under these conditions it is required that proper means be provided to detect the presence or absence of oil at the friction surface of the bearing. For this purpose, and in accordance with the teachings of the instant invention, a detecting device is provided comprising a pressure responsive switch 26, and a line 27 connecting this switch with the inside friction surfaces of the bearing. To provide for the latter requirement, the bearing cap 14 is drilled to form a port 28 therein which is aligned with a similarly sized hole 29 drilled in the shell 15 to enter the groove. The line 27 which connects with the port 28, thus receives oil under pressure which is present at the friction surface of the bearing shell 15.

The pressure switch 26 may take any suitable form and may open or close under the effects of oil pressure. Likewise, it may be used to perform one, or more than one, of several functions. For example, it may be arranged to energize an electric circuit which will give an audible or visual warning signal of oil failure at the bearing, or such circuit may be arranged to break the engine's ignition circuit, cut off its fuel supply, or otherwise stop the engine. Further, the line 27 may be connected directly to a pressure gauge which will give at all times an indication of the oil pressure which is acting at the bearing, not merely in the supply line to the bearing.

In any case, it is to be noted, that a false indication of pressure at the switch 26 could occur, were means not provided to prevent it. Thus if the shell 15 were to be turned to close the port 19, the port 28 would likewise be closed, and although oil through the line 18 would be cut off from the bearing, the residual pressure of the oil blocked off in the line 27 would be sufficient to give a false indication at the switch 26. Similarly, if the port 28 were to become clogged the same condition would result.

To prevent the effects of residual pressure acting at the switch 26, or any other pressure responsive device similarly located, a bleeder 31 (Fig. 3) is inserted in the line 27 immediately ahead of the switch 26. This device provides a small orifice 32 which opens the line 27 to atmospheric pressure within the crank case 12. The size of this orifice is such that the oil pressure acting at the switch 26 is not materially reduced in so long as the oil circuit from the header 17 through the port 19, the hole 21, the groove 16, the hole 29, the port 28 and the line 27 is unimpaired. If, however, oil under pressure is cut off at any point ahead of the bleeder 31, the oil, which is trapped in the circuit between this point and the pressure responsive device 26, will bleed out through the orifice 32 and into the crank case 12, and the switch 26 will be conditioned to perform its desired function.

As is illustrated in Fig. 4, the invention affords a complete detecting system for all of the bearings of an engine. Here a four cylinder engine is exemplified, and the invention is shown as being applied to three main bearings 33, 34, and 35, additional to the main bearing 11. As described previously, the main journal 22 and the crank pin 24 receive oil from the header 17 and are detected through the line 27 by the pressure responsive device 26. Similarly, a main journal 36, 37 and 38 and a crank pin 39, 41 and 42, are supplied oil from the header 17 by a separate line 43, 44 and 45 to each of the main bearings 33, 34 and 35, respectively. Also, the main bearings 33, 34, and 35 are detected through a separate line 46, 47 and 48, respectively, by a pressure responsive device 49, 51 and 52.

All of the pressure responsive devices 26, 49, 51 and 52, which by way of example are pressure operated switches, are connected in series with a solenoid 53 and an electrical power source 54 by two lines 55 and 56.

If the switches 26, 49, 51 and 52 are considered to be normally pressure closed and the solenoid 53 normally energized, a drop in oil pressure below a predetermined amount at any one of the main bearings 11, 33, 34 or 35 will cause a drop in oil pressure at either of the switches 26, 49, 51 or 52 causing one of the latter to open and deenergize the solenoid 53. The solenoid, in turn, operates an energy translating device, or devices, which may be of different types. Thus, the solenoid 53 may be arranged to operate an engine control device 57, which may take the form of an ignition switch or fuel supply valve, to shut down the engine. Also, the solenoid 53 may be used to close a switch 58 which in turn will energize an alarm circuit 59, to operate a warning signal device 61, either of the visual or audible type. Such an alarm will thus warn an operator of any oil pressure failure and he can take any action required. Also, any drop in oil pressure at the bearings for the crank pins 24, 39, 41 and 42 will have similar effects on the pressure responsive devices 26, 49, 51 or 52, so long as the line (25 for the crank pin 24) connecting the pin with the journal which supplies it oil is open.

Further, each of the lines 27, 46, 47 and 48 may be connected, respectively, to gauges 62, 63, 64 and 65, to indicate the oil pressure actually effective at each of the main bearings 11, 33, 34 and 35. Through this expedient, periodic inspection of the gauges may indicate gradual pressure drops and trouble may be detected before it becomes serious and corrective measures taken.

Additionally, the detecting apparatus of the instant invention may be used with any conventional low pressure engine shut-down, or alarm, system. In this manner, presently installed equipment may be used by simply connecting its pressure responsive devices to the engine bearings in accordance with the teachings herein made. Also, and in this regard, it is to be noted that the detecting apparatus herein disclosed is not only capable of detecting conditions resulting from oil supply failures, but is also effective in detecting bad bearing conditions resulting from other causes. For example, a loose bearing or a damaged bearing would be detected, since either condition would cause an unusual pressure drop at the bearing even though the supply were maintained.

Various changes may be made in the details of construction, within the scope of the appended claims, without departing from the spirit of this invention. Parts of the invention may be used without the whole and improvements may be added while retaining some or all of the advantages of the invention.

I claim:

1. In a system for protecting a bearing of an engine against failure of a lubricating oil supply to said bearing, a line connecting with a port communicating with a friction surface of said bearing, a pressure responsive device connected to said line, means actuated by said responsive device operable to give an alarm signal indicative of a failure of oil supply at said bearing, and a bleeder connected in said line immediately ahead of said pressure responsive device adapted to release the pressure of oil trapped between said bearing and said pressure responsive device.

2. In a system for protecting a bearing of an engine against failure of a lubricating oil supply to said bearing, a line connecting with a port communicating with a friction surface of said bearing, a pressure responsive device connected to said line, means actuated by said responsive device operable to effect a shut down of said engine, and a bleeder connected in said line immediately ahead of said pressure responsive device adapted to release the pressure of oil trapped between said bearing and said pressure responsive device.

3. In a system for protecting a bearing of an engine against failure of a lubricating oil supply to said bearing, a line connecting with a port communicating with a friction surface of said bearing, a gauge connected to said line adaptable to give an indication of an oil pressure acting at the friction surface of said bearing, and a bleeder connected in said line ahead of said gauge adapted to prevent a registration by the same of the pressure of oil trapped between said bearing and said gauge.

CLARENCE P. FISCHER.

REFERENCES CITED

The following references are of record in the file of this patent:

UNITED STATES PATENTS

| Number | Name | Date |
| --- | --- | --- |
| 1,289,903 | Pogue | Dec. 31, 1918 |
| 1,359,944 | Witham | Nov. 23, 1920 |
| 1,573,371 | Bloch | Feb. 16, 1926 |
| 1,725,050 | Bloch | Aug. 20, 1929 |
| 1,834,600 | Wineman | Dec. 1, 1931 |